United States Patent
Lee et al.

(10) Patent No.: US 10,214,681 B2
(45) Date of Patent: Feb. 26, 2019

(54) METHOD FOR TREATING A SUBTERRANEAN FORMATION

(71) Applicant: Schlumberger Technology Corporation, Sugar Land, TX (US)

(72) Inventors: Wingki Lee, Sugar Land, TX (US); Sergey Makarychev-Mikhailov, Richmond, TX (US); Richard Donald Hutchins, Sugar Land, TX (US); Camille Meza, Suger Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 148 days.

(21) Appl. No.: 14/676,162

(22) Filed: Apr. 1, 2015

(65) Prior Publication Data
US 2016/0289544 A1    Oct. 6, 2016

(51) Int. Cl.
*C09K 8/68*    (2006.01)
*C09K 8/80*    (2006.01)
(Continued)

(52) U.S. Cl.
CPC ............... *C09K 8/68* (2013.01); *C09K 8/685* (2013.01); *C09K 8/80* (2013.01); *C09K 8/887* (2013.01); *C09K 8/905* (2013.01); *C09K 2208/24* (2013.01)

(58) Field of Classification Search
CPC . C09K 8/68; C09K 8/685; C09K 8/80; C09K 8/887; C09K 8/905; C09K 2208/24
(Continued)

(56) References Cited

U.S. PATENT DOCUMENTS 4,659,811 A * 4/1987 Wu .......................... C09K 8/62
                                                    507/211
5,067,566 A     11/1991 Dawson
(Continued)

FOREIGN PATENT DOCUMENTS

WO      2013155061 A1    10/2013

OTHER PUBLICATIONS

International Search Report and Written Opinion issued in International Patent Application No. PCT/US2016/023029 dated Jun. 24, 2016; 9 pages.
(Continued)

*Primary Examiner* — Aiqun Li
(74) *Attorney, Agent, or Firm* — Andrea E. Tran

(57) ABSTRACT

A method of treating a subterranean formation including combining an aqueous fluid, a biomaterial, an enzyme, and a deactivator to form a treatment fluid; and introducing the treatment fluid into the subterranean formation. A method is also disclosed for treating a subterranean formation by preparing a treatment fluid containing an aqueous fluid that contains bacterial and/or fungal cells that produce an enzyme that degrades the biomaterial, a biomaterial, and a deactivator; controlling degradation of the biomaterial by adding an effective amount of the deactivator to the aqueous fluid prior to the preparation of the treatment fluid; and introducing the treatment fluid into the subterranean formation. In the methods, the enzyme degrades the biomaterial and the deactivator is an oxygen-containing arene capable of inhibiting the enzyme from degrading the biomaterial.

17 Claims, 5 Drawing Sheets

(51) Int. Cl.
   *C09K 8/88*       (2006.01)
   *C09K 8/90*       (2006.01)

(58) Field of Classification Search
   USPC .................................. 507/201; 166/305.1
   See application file for complete search history.

(56) References Cited

U.S. PATENT DOCUMENTS

| | | |
|---|---|---|
| 6,776,235 B1 | 8/2004 | England |
| 6,818,594 B1 | 11/2004 | Freeman et al. |
| 7,052,901 B2 | 5/2006 | Crews |
| 7,581,590 B2 | 9/2009 | Lesko et al. |
| 7,942,201 B2 | 5/2011 | Ekstrand et al. |
| 8,833,457 B2 | 9/2014 | Armstrong et al. |
| 2002/0169085 A1 | 11/2002 | Miller et al. |
| 2002/0193343 A1 | 12/2002 | Khan et al. |
| 2007/0173414 A1* | 7/2007 | Wilson, Jr. ............... C09K 8/04 507/240 |
| 2008/0099207 A1 | 5/2008 | Venditto et al. |
| 2008/0149329 A1 | 6/2008 | Cooper et al. |
| 2013/0105166 A1 | 5/2013 | Medvedev et al. |
| 2014/0121136 A1 | 5/2014 | Mirakyan et al. |
| 2014/0345871 A1 | 11/2014 | Misra et al. |

OTHER PUBLICATIONS

Tejirian et al., "Inhibition of enzymatic cellulolysis by phenolic compounds", Enzyme and Microbial Technology, 2011, vol. 48, No. 3, pp. 239-247.

* cited by examiner

METHOD FOR TREATING A SUBTERRANEAN FORMATION

BACKGROUND

Hydrocarbons, for example, oil, natural gas, and the like, may be obtained from a subterranean geologic formation by drilling a well that penetrates the hydrocarbon-bearing formation. Well treatment methods often are used to increase hydrocarbon production by using a treatment fluid to interact with a subterranean formation in a manner that ultimately increases oil or gas flow from the formation to the wellbore for removal to the surface.

Well treatment fluids, particularly those used in fracturing or those used in gravel packing operations, may contain a water or oil based fluid incorporating a thickening agent, normally a biomaterial or polymeric material. Such fracturing fluids often have a high viscosity during treatment of a subterranean formation to develop a desired fracture geometry and/or to carry proppant into a fracture with sufficient resistance to settling.

However, bacterial or fungal cells may be present in the treatment fluid. The bacterial or fungal cells may produce enzymes that degrade the biomaterial present in the treatment fluid for providing viscosity. As a result, the viscosity of the treatment fluid may decrease. Enzymes may also be employed as a breaker to reduce the viscosity of the fluid downhole for recovery of the fracturing fluid such that the fluid flows naturally through the proppant pack.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a method for treating a subterranean formation including combining an aqueous fluid, a biomaterial, an enzyme, and a deactivator to form a treatment fluid, and introducing the treatment fluid into the subterranean formation. The enzyme in the treatment fluid degrades the biomaterial and the deactivator is an oxygen-containing arene capable of inhibiting the enzyme from degrading the biomaterial.

The subject matter is also directed to a method for treating a subterranean formation including preparing a treatment fluid containing an aqueous fluid, a biomaterial, and a deactivator; controlling degradation of the biomaterial by adding an effective amount of the deactivator to the aqueous fluid prior to the preparation of the treatment fluid; and introducing the treatment fluid into the subterranean formation. The aqueous fluid contains bacterial and/or fungal cells that produce an enzyme that degrades the biomaterial. The deactivator is an oxygen-containing arene capable of inhibiting the enzyme from degrading the biomaterial.

BRIEF DESCRIPTION OF THE DRAWINGS

Embodiments of the method for treating a subterranean formation are described with reference to the following figures. The same numbers are used throughout the figures to reference like features and components.

DETAILED DESCRIPTION

Figure 1:
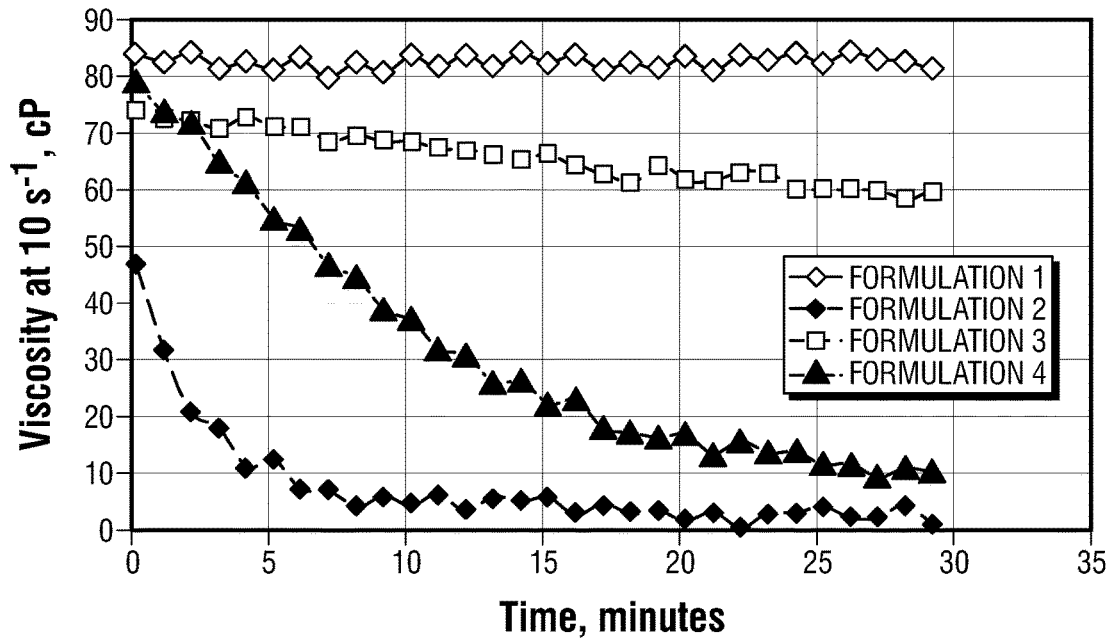
FIG. 1 is a line graph illustrating the viscosity increasing effects of 1,5-dihydroxynaphthlene at 50° C.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if a specific data points within the range, or even no data points within the range, are explicitly identified or refer to a few specific, it is to be understood that inventors appreciate and understand that any conceivable data point within the range is to be considered to have been specified, and that inventors possessed knowledge of the entire range and each conceivable point and sub-range within the range.

Disclosed herein is a method for treating a subterranean formation. The method includes first preparing a treatment fluid. The treatment fluid may include, for example, an aqueous fluid, a biomaterial, an enzyme, and a deactivator. Then, the treatment fluid is introduced into the subterranean formation.

The treatment fluids used in the present method are, for example, prepared from an aqueous fluid such as water, brine, aqueous foams, or water-alcohol mixtures. A biomaterial, an enzyme, and a deactivator may be combined with the aqueous fluid to form the treatment fluid. The treatment fluid may also include other ingredients, such as proppant particles and crosslinking agents. Any suitable mixing apparatus may be used to provide the treatment fluid.

Biomaterial, such as a polysaccharide, is included in the treatment fluid to provide viscosity to the treatment fluid. Enzymes that are often present in the aqueous base fluid or added to the treatment fluid, however, degrade the biomaterial and, therefore, decrease the viscosity of the treatment fluid. The viscosity of the treatment fluid may be adequately maintained by adding a deactivator to the treatment fluid. The deactivator is any compound capable of inhibiting the enzymes from degrading the biomaterial. Therefore, the deactivator may be added in an effective amount to control the degradation of the biomaterial by the enzymes. By combining the aqueous fluid with the deactivator in preparing the treatment fluid, the viscosity of the treatment fluid is higher than it would be without the deactivator. By including the deactivator in the treatment fluid, the viscosity may be adjusted, for example, the viscosity may be adjusted to be equal to a viscosity of the treatment fluid without any enzymes.

As used herein, the term "treatment fluid," refers to any pumpable and/or flowable fluid used in a subterranean operation in conjunction with a desired function and/or for a desired purpose. In some embodiments, the pumpable and/or flowable treatment fluid may have any suitable viscosity, such as a viscosity of from about 10 cP to about 5,000 cP, such as from about 10 cP to about 1,000 cP, or from about 10 cP to about 500 cP, at a shear rate of about 100 $s^{-1}$ (for the definition of shear rate, reference is made to, for example, Introduction to Rheology, Barnes, H.; Hutton, J. F; Walters, K. Elsevier, 1989, the disclosure of which is herein incorporated by reference in its entirety) as measured by common methods, such as those described in textbooks on rheology, including, for example, Rheology: Principles, Measurements and Applications, Macosko, C. W., VCH Publishers, Inc. 1994, the disclosure of which is herein incorporated by reference in its entirety.

In the treatment fluid, the aqueous fluid may be contaminated with bacterial and/or fungal cells that produce the enzyme or a portion of the enzyme present in the treatment fluid. In some embodiments, the aqueous fluid is contaminated with bacterial and/or fungal cells that produce an enzyme that degrades the biomaterial. When the aqueous fluid is contaminated with the enzyme, additional enzymes may or may not be added to the aqueous fluid in forming the treatment fluid. In some embodiments, additional enzymes may be added to aqueous fluid contaminated with enzymes to control breaking of the polymer and adjust a viscosity of the treatment fluid. In other embodiments, the aqueous fluid may not be contaminated with any enzymes or bacterial and/or fungal cells that produce the enzyme. In those embodiments, enzymes may be added to the treatment fluid to adjust the viscosity of the treatment fluid.

Such bacterial and/or fungal cells include any bacterial or fungal cell capable of producing an enzyme that degrades the biomaterial. For example, the bacterial cells may be from the *Thermotogas* species, which is a group of hyperthermophilic bacteria, such as *Thermotoga neapolitana* and *Thermotoga maritime*. The bacterial cells may also include those in the class *Bacillus, Citrobacter, Paenibacillus, Pseudomonas, Escherichia* and *Enterococcus*, such as *Bacillus subtilis, Citrobacter freundii, Pseudomonas fluorescens, Escherichia coli*, and *Enterococcus faecalies*. The fungal cells may include, for example, *Aspergillus niger, Humicola, Penicillium, Neurospora, Chaetomium*, and *Fusarium*. In some embodiments, one or more types of bacterial and fungal cells may be combined or present in the treatment fluid.

The enzymes used in the present method may be any enzyme capable of degrading the biomaterial. The enzyme may be any oxidoreductase, hydrolase, cellulase, or lyase enzyme that is capable of degrading the biomaterial. For example, the enzymes may include, cellulases, hemi-cellulases, pectinases, xanthanase, mannanase, glucosidase, α-galactosidase, endoxylanase, amylase, hydrolase, glucanase, exo-xylanase, endo-amylases, oxidase, and combinations thereof. Amylases may include α-, β-, and γ-amylases.

The enzymes may degrade the particular linkages found in the biomaterial backbone, such as the 1,4-linkages between mannose in galactomannans in the case of mannanases or cellulosics. Xanthanases, for example, can degrade xanthan-containing materials.

In one embodiment, bacterial cells, fungal cells, or enzymes may be selected for their ability to digest or degrade a specific biomaterial. For example, *Thermotoga neapolitana* is known to produce hydrolase enzymes. Hydrolases are a class of enzymes suitable for degrading guar-containing materials. These enzymes attack the mannosidic and galactomannosidic linkages in the guar residue, breaking the molecules into monosaccharide and disaccharide fragments. Under some conditions, these enzymes hydrolyze the residue completely into monosaccharide fragments. Other enzymes that degrade guar are galactomannan hydrolases, collectively called galactomannanase, and they specifically hydrolyze the (1,6)-α-D-galactomannosidic and the (1,4)-β-D-mannosidic linkages between the monosaccharide units in guar, respectively.

The enzyme may be in the treatment fluid in an amount in a range of about 10 ppm to about 5000 ppm, such as about 50 ppm to about 500 ppm or about 100 ppm to about 300 ppm.

The biomaterial may be natural or derivatized polysaccharides, such as carboxymethyl cellulose (CMC), carboxymethylhydroxyethyl cellulose (CMHEC), carboxymethyl guar (CMG), carboxymethylhydroxypropyl guar (CMHPG), xanthan, alginate, diutan, and welan gum. In some embodiments, the biomaterial may be, for example, a guar gum, a locust bean gum, a tara gum, a honey locust gum, a tamarind gum, a karaya gum, an arabic gum, a ghatti gum, a tragacanth gum, a carrageenen, a succinoglycan, xanthan, diutan, alginate, hydroxylethylguar hydroxypropyl guar, carboxymethylhydroxyethyl guar, carboxymethylhydroxypropylguar (CMHPG), carboxymethyl cellulose (CMC), carboxyethyl cellulose, carboxymethyl guar (CMG) carboxymethylhydroxyethyl cellulose (CMHEC), and derivatives and combinations thereof.

The biomaterial may be combined with the aqueous fluid in an amount in a range of about 0.1 g/L to about 20 g/L, such as about 1 g/L to about 10 g/L or about 1 g/L to about 5 g/L.

The deactivator may be any oxygen-containing arene capable of inhibiting the enzyme from degrading the biomaterial. In particular, the deactivator may have one or more structural units, such as a phenol, naphthol, dimethoxybenzene, trimethoxybenzene, or a structure represented by Formula (1):

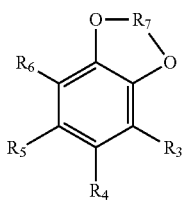

Formula (1)

In Formula (1), R7 represents an alkyl group having about 1 to about 5 atoms optionally including one or more heteroatoms; and R3, R4, R5, and R6 each independently represents a hydrogen atom, a hydroxyl group, an alkyl group, an alkene group, an ester, a carboxylic acid, an alcohol, an aldehyde, a ketone, an aryl, an aryloxy, cycloalkyl, a carbonyl, or an amino group.

In some embodiments, the deactivator may be a phenolic compound or include a phenol subunit. For example, the phenolic compound may have a structure represented by Formula (2):

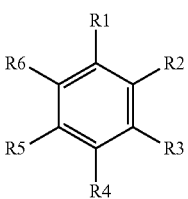

Formula (2)

In Formula (2), R1 is OH; each of R2, R3, R4, R5, and R6 may independently be a hydrogen, hydroxyl group, alkyl group, alkene group, esters, carboxylic acid, alcohol, or aldehyde.

When one or more of R2, R3, R4, R5, and R6 is an alkyl group or an alkene group, the group may contain about 1 to about 18 carbon atoms, such as about 2 to about 15 or about 5 to about 12 carbon atoms.

The deactivators having a phenol structure or a phenol subunit may include, for example, methoxyphenol, ethoxyphenol, propoxyphenol, butoxyphenol, dimethoxyphenol, trimethoxyphenol, dihydroxy-methoxybenzene, dihydroxy-dimethoxybenzene, trihydroxyphenol, methoxy-methylphenol, allyl methoxyphenol, allyl dimethoxyphenol, rutin hydrate, epigallocatechin, epicatechin, 5-(3'4'5'-trihydroxyphenyl)-γ-valerolactone, gallic acid, tannic acid, vanillic acid, and salicylic acid. Examples of chemicals that have a sub-unit of the general formula 1 are tannic acid, polyphenon 60, ligninsulfonate, hesperidin, rutin hydrate, epigallocatechin gallate, 1-amino-2-naphthol, 2-amino-1-naphthol, 3-amino-2-naphthol, 4-amino-1-naphthol, 8-amino-1-naphthol, and 5-amino-1-naphthol.

In other embodiments, the deactivator may have a structure or include a structural subunit represented by Formula (3):

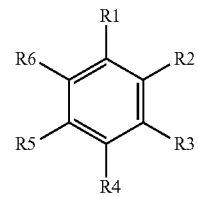

Formula (3)

In Formula (3), R1 is OCH$_3$; each of R2, R3, R4, R5, and R6 may independently be a hydrogen, alkyl group, alkene group, ester, carboxylic acid, alcohol, aldehyde, ketone, or amino group.

Deactivators including a structure represented by Formula (3) may include, for example, 1,2-dimethoxybenzene, 1,3-dimethoxybenzene, 1,2,3-trimethoxybenzene, 1,2,4-trimethoxybenzene, 1,2,5-trimethoxybenzene, 1,2,6-trimethoxybenzene, and 1,3,5-trimethoxybenzene.

For example, the deactivator may be methoxyphenol, ethoxy phenol, propoxyphenol, butoxyphenol, dimethoxyphenol, trimethyoxyphenol, dihydroxy-methoxybenzene, dihydroxy-dimethoxybenzene, trihydroxyphenol, methoxy-methylphenol, allyl methoxyphenol, allyl dimethoxyphenol, rutin hydrate, epicatechin, 5-(3, 4, 5-trihydroxyphenyl)-γ-valerolactone, gallic acid, tannic acid, vanillic acid, salicyclic acid, guaiacol, polyphenon 60, liginsulfonate, hesperidin, epigallocatechin gallate, 1-amino-2-naphthol, 2-amino-1-naphthol, 3-amino-2-naphthol, 4-amino-1-naphthol, 8-amino-1-naphthol, 5-amino-1-naphthol, 1,2-dimethoxybenzene, 1,3-dimethoxybenzene, 1,2,3-trimethoxybenzene, 1,2,4-trimethoxybenzene, 1,2,5-trimethoxybenzene, 1,2,6-trimethoxybenzene, and 1,3,5-trimethoxybenzene, 1,3-benzodioxole, benzo-1,4,-dioxane, 2,3-dihydro-1,4,-benzodioxin-5-ol, 5-methoxy-1,3-benzodioxole, 5,6-dihydroxy-1,3-benzodioxole, sesamol, 5-methyl-1,3-benzodioxole, sesamin, piperonyl alcohol, piperonal, and 3,4-methylenedioxy aniline, 1,8-dihydroxynaphthalene, 1,5-dihydroxynaphthalene, 2,3-dihydroxynaphthalene, 2,7-dihydroxynaphthalene, 1,7-dihydroxynaphthalene, and 2,6-dihydroxynaphthalene.

The deactivator may be present in the treatment fluid in an effective amount for controlling the degradation of the biomaterial by the enzyme and adjusting the viscosity of the treatment fluid. For example, the deactivator may be present in the treatment fluid in an amount in a range of from about 0.005 g/L to about 15 g/L, such as about 0.1 g/L to about 10 g/L or about 0.1 g/L to about 1.5 g/L.

In preparing the treatment fluid, the aqueous fluid may be first combined with the deactivator. The aqueous fluid may be contaminated with bacterial and/or fungal cells that produce an enzyme capable of degrading the biomaterial. Then, the biomaterial is added to the aqueous fluid containing the deactivator and enzymes to form the treatment fluid. In some embodiments, the enzyme may be added to the aqueous fluid first, followed by addition of the deactivator, to control the breaking of the biomaterial and adjust a viscosity of the treatment fluid. The present method may include determining effective amounts of the enzyme and the deactivator to add to the aqueous fluid for optimal breaking of the biomaterial and optimal viscosity of the treatment fluid.

For example, before introducing the treatment fluid into the subterranean formation, the viscosity of the treatment fluid may be adjusted to be a viscosity in a range of from about 10 cP to about 5,000 cP. Adjusting the viscosity of the treatment fluid may be carried out by increasing an amount of the deactivator or an amount of the enzyme in the treatment fluid. For example, the deactivator may be increased to an amount in a range of from about 0.005 g/L to about 15 g/L, such as about 0.05 g/L to about 10 g/L or about 0.1 g/L to about 5 g/L.

In some embodiments, the present method may include measuring an amount of bacterial and/or fungal cells present in the aqueous fluid prior to forming the treatment fluid. Based on the measured amount of bacterial and/or fungal cells present in the aqueous fluid, an effective amount of the deactivator for controlling the degradation of the biomaterial and adjusting the viscosity of the treatment fluid to be in a range of from about 10 cP to about 5,000 cP may be determined After the amount of bacterial and/or fungal cells has been measured, the effective amount of the deactivator may be combined with the aqueous fluid. Additional enzymes may also be added to the aqueous fluid prior to adding the deactivator to control the breaking of the biomaterial. Then, the biomaterial may be added to form the treatment fluid.

A crosslinking agent may be used to carry out the present method. Examples include metal ions, such as aluminum, antimony, zirconium and titanium containing compounds including organotitantates. Borate crosslinking agents or borate ion donating materials, may also be used in the present method. Examples of these include the alkali metal and alkaline earth metal borates and boric acid, such as sodium borate decahydrate. The crosslinking agent may be included in an amount in the range of from about 0.005 to 10% by weight of the treatment fluid, such as about 0.05 to about 5% by weight or about 0.05 to about 1.5% by weight.

Proppant particles or propping agents may also be added to the treatment fluid. The proppant particles used in the methods of the present disclosure may be any appropriate size to prop open the fracture and allow fluid to flow through the proppant pack, that is, in between and around the proppant making up the pack. In some embodiments, the proppant may be selected based on desired characteristics, such as size range, crush strength, and insolubility. In embodiments, the proppant may have a sufficient compressive or crush resistance to prop the fracture open. In embodiments, the proppant may not dissolve in treatment fluids commonly encountered in a well.

Any proppant may be used, provided that it is compatible with the treatment fluid of the present disclosure, the formation, the fluid, and the desired results of the treatment operation. Such proppants may be natural or synthetic (including silicon dioxide, sand, nut hulls, walnut shells, bauxites, sintered bauxites, glass, natural materials, plastic beads, particulate metals, drill cuttings, ceramic materials, and any combination thereof), coated, or contain chemicals; more than one may be used sequentially or in mixtures of different sizes or different materials. The proppant may be resin coated, provided that the resin and any other chemicals in the coating are compatible with the other chemicals of the treatment fluid, such as the deactivator.

The proppant used may have an average particle size of from about 0.15 mm to about 2.39 mm (about 8 to about 100 U.S. mesh), or of from about 0.25 to about 0.43 mm (40/60 mesh), or of from about 0.43 to about 0.84 mm (20/40 mesh), or of from about 0.84 to about 1.19 mm (16/20), or of from about 0.84 to about 1.68 mm (12/20 mesh) and or of from about 0.84 to about 2.39 mm (8/20 mesh) sized materials. The proppant may be present in a slurry (which may be added to the treatment fluid) in a concentration of from about 0.12 to about 3 kg/L, or about 0.12 to about 1.44 kg/L (about 1 PPA to about 25 PPA, or from about 1 to about 12 PPA; PPA is "pounds proppant added" per gallon of liquid).

The treatment fluids used for carrying out the present method may be provided in any suitable physical form, such as concentrated or dilute aqueous solutions or lyophilized powders.

While the treatment fluids of the present disclosure are described herein as comprising the above-mentioned components, it should be understood that the treatment fluids of the present disclosure may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers, provided that the other components chosen for the mixture are compatible with the intended use of the treatment fluid. Furthermore, the treatment fluid may comprise buffers, pH control agents, surfactants, antioxidants, corrosion inhibitors, and various other additives added to promote the stability or the functionality of the treatment fluid. The components of the treatment fluid may be selected such that they may or may not react with the subterranean formation that is to be treated.

In this regard, the treatment fluid may include components independently selected from any solids, liquids, gases, and combinations thereof, such as slurries, gas-saturated or non-gas-saturated liquids, mixtures of two or more miscible or immiscible liquids, and the like, as long as such additional components allow for adjustment of the viscosity of the treatment fluid by the deactivator inhibiting the enzyme from degrading the biomaterial. For example, the treatment fluid may comprise organic chemicals, inorganic chemicals, and any combinations thereof. Organic chemicals may be monomeric, oligomeric, polymeric, crosslinked, and combinations, while polymers may be thermoplastic, thermosetting, moisture setting, elastomeric, and the like. Inorganic chemicals may be metals, alkaline and alkaline earth chemicals, minerals, and the like.

Stabilizing agents, such as buffering agents and chelating agents may be added to the treatment fluid. Buffering agents may include, for example, water-soluble bicarbonate salts, carbonate salts, phosphate salts, or mixtures thereof, among others. Chelating agents may include, for example, ethylenediaminetetraacetic acid (EDTA), nitrilotriacetic acid (NTA), or diethylenetriaminepentaacetic acid (DTPA), hydroxyethylethylenediaminetriacetic acid (HEDTA), or hydroxyethyliminodiacetic acid (HEIDA), among others. Buffering agents may be added to the treatment fluid in an amount of at least about 0.05 wt %, such as from about 0.05 wt % to about 10 wt %, and from about 0.1 wt % to about 2 wt %, based upon the total weight of the treatment fluid. Chelating agents may be added to the treatment fluid in an amount of at least about 0.75 mole per mole of metal ions expected to be encountered in the downhole environment, such as at least about 0.9 mole per mole of metal ions, based upon the total weight of the treatment fluid.

The treatment fluid may be used to treat, for example, subterranean formations that surround any type of wellbore, including both oil and gas wellbores, with the treatment fluid being provided and injected and pressure released.

The term "treatment," or "treating," does not imply any particular action by the treatment fluid. For example, a treatment fluid placed or introduced into a subterranean formation subsequent to a leading-edge fluid may be a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a driller fluid, a frac-packing fluid, or gravel packing fluid.

The term "fracturing" refers to the process and methods of breaking down a geological formation and creating a fracture, such as the rock formation around a wellbore, by pumping a treatment fluid at very high pressures (pressure above the determined closure pressure of the formation), in order to increase production rates from or injection rates into a hydrocarbon reservoir. The fracturing methods of the present disclosure may include a composition containing a biomaterial, an enzyme, a deactivator in one or more of the treatment fluids, but otherwise use conventional techniques and components known in the art, such as fracturing with heterogeneous proppant placement (including, for example, using pulsed proppant injection), for example, as described in U.S. Pat. Nos. 6,776,235 and 7,581,590, and U.S. Patent Application Publication Nos. 2008/0149329 and 2013/0105166, the disclosures of which are herein incorporated by reference in their entireties.

A "wellbore" may be any type of well, including, a producing well, a non-producing well, an injection well, a fluid disposal well, an experimental well, an exploratory deep well, and the like. Wellbores may be vertical, horizontal, deviated some angle between vertical and horizontal, and combinations thereof, for example a vertical well with a non-vertical component.

In some embodiments, the subterranean formation may be hydraulically fractured or treated by injecting the treatment fluid into the subterranean formation, for example, in a wellbore. Introducing the treatment fluid into the subterranean formation may be performed, for example, by injecting the fluid into a well: (1) through drilling pipe; (2) through coiled tubing including for example, a microcoil with a diameter of about 1.25 cm (one-half inch) or less; (3) through the annulus space between any tubular strings positioned in the wellbore; (4) by using bailers or downhole containers; through any tubular strings positioned in the wellbore; (5) pumping downhole through casing; or (6) any combination of the foregoing methods.

The treatment method may include pumping the treatment fluid down the wellbore as a slurry or mixture of suspended solids and liquids. The treatment fluid may be prepared at or near the site of its intended use (for example, a wellbore) or to reduce the expense associated with the transport of equipment and materials, and the expertise to prepare a treatment fluid on site, the treatment fluid may be prepared at a remote location and shipped to the site of its intended use. The treatment fluid may be easily pumpable and pourable, and where it is prepared offsite, remain stable for long periods of time, for example, about 30 days or more, exhibiting minimum separation of liquid and solids and no packing of the solid particles or fibers.

In embodiments, the treatment fluid may be driven into a wellbore by a pumping system that pumps one or more treatment fluids into the wellbore. The pumping systems may include mixing or combining devices, wherein various components, such as fluids, solids, and/or gases maybe mixed or combined prior to being pumped into the wellbore. The mixing or combining device may be controlled in a number of ways, including, but not limited to, using data obtained either downhole from the wellbore, surface data, or some combination thereof.

Fracturing a subterranean formation may include introducing hundreds of thousands of gallons of treatment fluid, such as a fracturing fluid, into the wellbore. In some embodiments a frac pump may be used for hydraulic fracturing. A frac pump is a high-pressure, high-volume pump, such as a positive-displacement reciprocating pump. In embodiments, a treatment fluid comprising the crimped fibers may be introduced by using a frac pump, such that the treatment fluid (such as a fracturing fluid) may be pumped down into the wellbore at high rates and pressures, for example, at a flow rate in excess of about 20 barrels per minute (about 4,200 U.S. gallons per minute) at a pressure in excess of about 2,500 pounds per square inch ("psi"). In some embodiments, the pump rate and pressure of the treatment fluid (such as a fracturing fluid) may be even higher, for example, flow rates in excess of about 100 barrels per minute and pressures in excess of about 10,000 psi may be used.

The foregoing is further illustrated by reference to the following examples, which are presented for purposes of illustration and are not intended to limit the scope of the present disclosure.

EXAMPLES

It should be recognized that the examples below are provided to aid in an understanding of the present teachings. The examples should not be construed so as to limit the scope and application of such teaching to the content of the examples.

The following example formulations were prepared by adding a desired amount of cellulase and then a deactivator to water. The polymer was hydrated in the mixed water with a Waring blender mixing at 1000-3000 rpm for 15 mins.

Example 1

Formulation 1 was prepared by adding 3.6 g/L guar to tap water.

Formulation 2 was prepared by adding 200 ppm cellulase to tap water. Then 3.6 g/L guar was added to the fluid.

Formulation 3 was prepared by adding 200 ppm cellulase and 0.6 g/L of 1,5-dihydroxynaphthalene from Sigma Aldrich to tap water. Then 3.6 g/L guar was added to the fluid.

Formulation 4 was prepared by adding 200 ppm cellulase and 0.24 g/L of 1,5-dihydroxynaphthalene from Sigma Aldrich to tap water. Then 3.6 g/L guar was added to the fluid.

To measure the viscosity of the solutions, 12 mL samples were loaded into a rheometer cup in a Bohlin rheometer with a C25 configuration. The rheology tests were performed at a shear rate of 10 s$^{-1}$ and temperatures of 50° C. and 80° C., the results of which are shown in FIG. 1 and FIG. 2, respectively.

Figure 2:
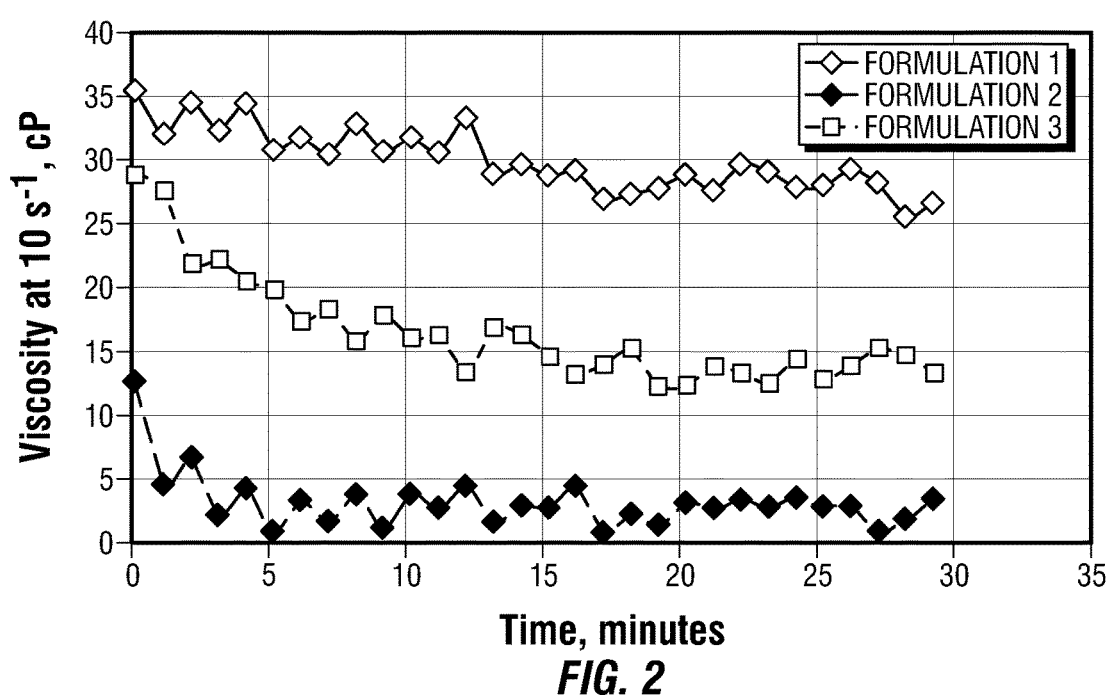
FIG. 2 is a line graph illustrating the viscosity increasing effects of 1,5-dihydroxynaphthlene at 80° C.

As shown in FIG. 1 and FIG. 2, Formulation 1, which did not contain the enzyme, had no or minimal viscosity reduction. When the cellulase enzymes were added, the viscosity of Formulation 2 was reduced at both 50° C. and 80° C. The degradation rate of the cellulase enzymes was reduced by the addition of 0.6 g/L of the deactivator, 1,5-dihydroxynapthlene (Formulation 3). As shown in FIG. 1 and FIG. 2, the viscosity of the formulations with 1,5-dihydroxynapthlene had a viscosity higher than the formulation without 1,5-dihydroxynapthlene at both 50° C. and 80° C. That is, the deactivator, 1,5-dihydroxynapthlene, effectively prevented the viscosity reduction of the guar solution by the cellulase enzymes.

FIG. 1 also shows that the viscosity reduction of the fluid can be controlled by adjusting the concentration of 1,5-dihydroxynapthlene. The higher the concentration of 1,5-dihydroxynapthlene used, the slower the viscosity was reduced.

Example 2

Formulation 1 was prepared by adding 3.6 g/L guar to tap water.

Formulation 2 was prepared by adding 3.6 g/L guar to water containing 11,000,000 CFU bacterial and/or fungal cells.

Formulation 3 was prepared by adding 0.4 g/L of tannic acid to Formulation 2.

The viscosities of Formulations 1-3 were measured immediately after mixing. To measure the viscosity of the solutions, 12 mL samples were loaded into a rheometer cup in a Bohlin rheometer with a C25 configuration. The rheology tests were performed at a shear rate of 1, 10, and 100 s$^{-1}$ at 22° C., the results of which are shown in FIG. 3.

Figure 3:
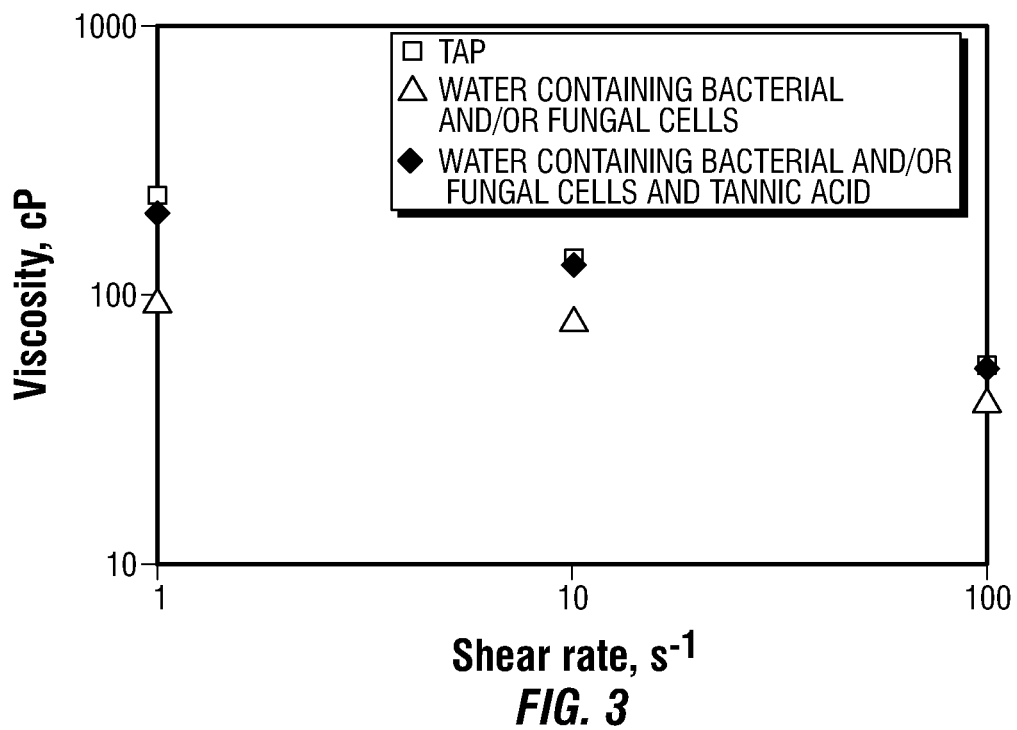
FIG. 3 is a graph illustrating the viscosity increasing effects of tannic acid at shear rates of 1, 10, and 100 $s^{-1}$.

As shown in FIG. 3, the guar biomaterial in Formulation 2 with 11,000,000 CFU bacterial or fungal cells was degraded and the treatment fluid had a lower viscosity compared to that of Formulation 1, which had a minimal concentration of bacterial and fungal cells. When 0.4 g/L tannic acid was added in Formulation 3 as a deactivator, the enzyme was inhibited from degrading the guar biomaterial. The viscosity of Formulation 3 was similar to that of Formulation 1.

Example 3

Formulation 1 was prepared by adding 3.6 g/L guar to tap water.

Formulation 2 was prepared by adding 200 ppm cellulase to tap water, followed by adding 2.6 g/L guar to the fluid.

Formulation 3 was prepared by adding 200 ppm cellulase, 0.96 g/L vanillic acid, and 3.6 g/L guar to tap water.

Formulation 4 was prepared by adding 200 ppm cellulase, 8 mL/L guaiacol, and 6 g/L guar to tap water.

Formulation 5 was prepared by adding 200 ppm cellulase, 8 mL/L gallic acid, and 3.6 g/L guar to tap water.

Formulation 6 was prepared by adding 200 ppm cellulase, 8 mL/L salicylic acid, and 3.6 g/L guar to tap water.

The viscosities of Formulations 1-6 were measured immediately after mixing. To measure the viscosity of the solutions, 12 mL samples were loaded into a rheometer cup in a Bohlin rheometer with a C25 configuration. The rheology tests were performed at a shear rate of 1, 10, and 100 s$^{-1}$ at 22° C., the results of which are shown in FIG. 4.

Figure 4:
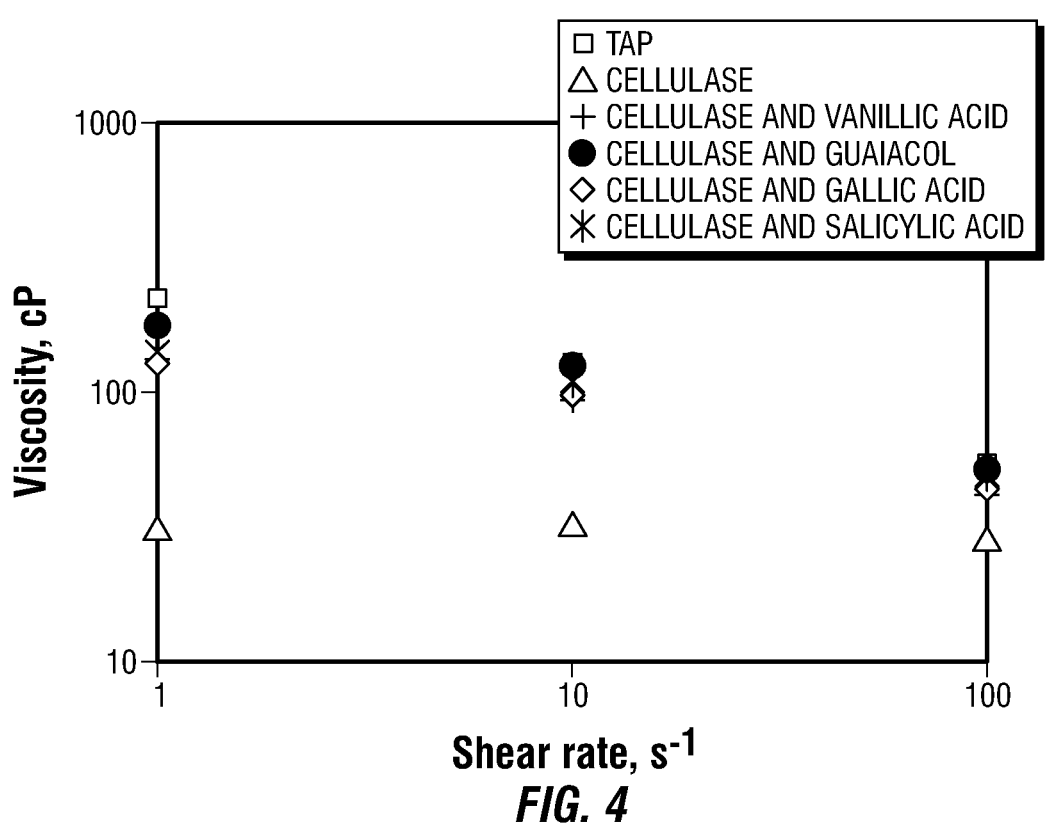
FIG. 4 is a graph illustrating the viscosity increasing effects of vanillic acid, guaiacol, gallic acid, and salicylic acid at shear rates of 1, 10, and 100 $s^{-1}$.

As shown in FIG. 4, Formulation 2, with 200 ppm cellulase and without a deactivator, had a lower viscosity compared to Formulation 1, which did not contain the cellulase enzymes. That is, the cellulase enzymes degraded the guar biomaterial in Formulation 2, resulting in a decreased viscosity. When 0.96 g/L vanillic acid (Formulation 3), 8 mL/L guaiacol (Formulation 4), 8 mL/L gallic acid (Formulation 5), or 8 mL/L salicylic acid (Formulation 6) was added to the fluid as a deactivator with cellulase, the degradation of the guar was impeded. The viscosities of Formulations 3, 4, 5, and 6 were similar to that of the Formulation 1, in which the tap water had a minimal concentration of bacterial and fungal cells.

Example 4

Formulation 1 was prepared by adding 3.6 g/L to tap water.

Formulation 2 was prepared by adding 200 ppm cellulase and 3.6 g/L guar to tap water.

Formulation 3 was prepared by adding 200 ppm cellulase, 0.4 g/L tannic acid, and 3.6 g/L guar to tap water.

Formulation 4 was prepared by adding 200 ppm cellulase, 0.36 g/L polyphenon 60, and 3.6 g/L guar to tap water.

The viscosities of Formulations 1-4 were measured immediately after mixing. To measure the viscosity of the solutions, 12 mL samples were loaded into a rheometer cup in a Bohlin rheometer with a C25 configuration. The rheology tests were performed at a shear rate of 1, 10, and 100 s$^{-1}$ at 22° C., the results of which are shown in FIG. 5.

Figure 5:
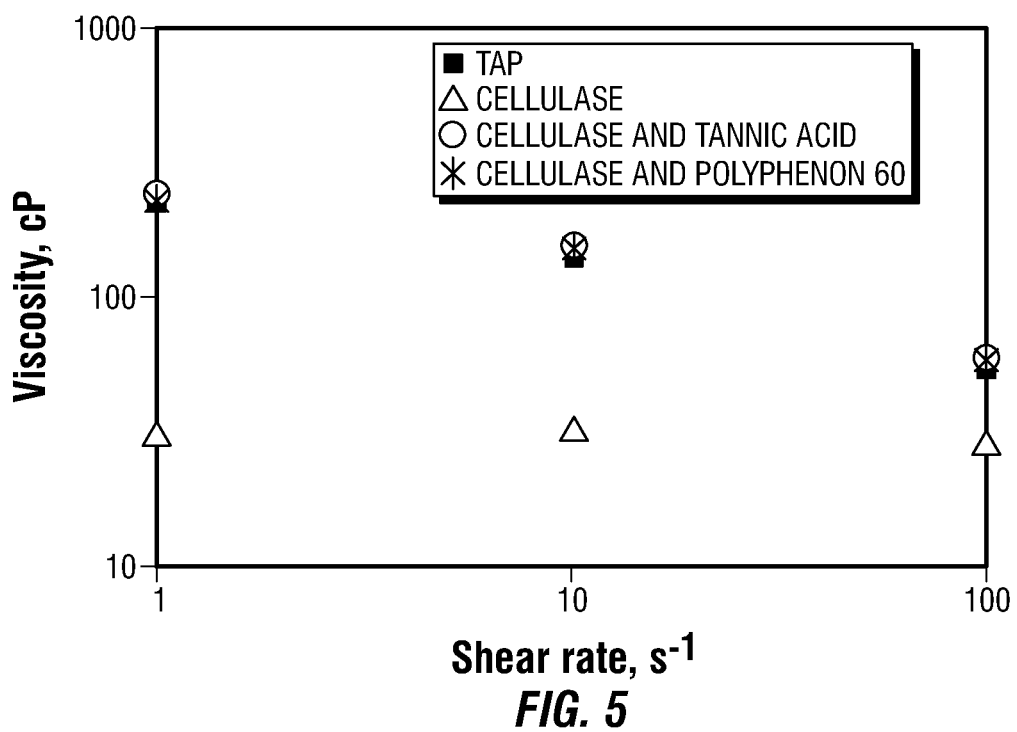
FIG. 5 is a graph illustrating the viscosity increasing effects of tannic acid and polyphenon 60 at shear rates of 1, 10, and 100 $s^{-1}$.

As shown in FIG. 5, the cellulase in Formulation 2 degraded the guar biopolymer. As a result, Formulation 2 had a lower viscosity compared to that of Formulation 1, which did not contain the cellulase enzymes. When 0.4 g/L tannic acid (Formulation 3) or 0.36 g/L polyphenon 60 (Formulation 4) was added as a deactivator to the fluid with cellulase, the degradation of the biomaterial by the cellulase enzymes was impeded. The viscosities of Formulations 3 and 4 were similar to that of Formulation 1, in which the tap water had a minimal concentration of bacterial and fungal cells.

Example 5

Formulation 1 was prepared by adding 3.6 g/L guar to tap water.

Formulation 2 was prepared by adding 200 ppm cellulase and 3.6 g/L guar to tap water.

Formulation 3 was prepared by adding 200 ppm cellulase, 0.36 g/L of 2,3-dihydroxynaphthalene, and 3.6 g/L guar to tap water.

Formulation 4 was prepared by adding 200 ppm cellulase, 0.6 g/L of 1,5-dihydroxynaphthalene, and 3.6 g/L guar to tap water.

Formulation 5 was prepared by adding 200 ppm cellulase, 0.12 g/L of 1,8-dihydroxynaphthalene, and 3.6 g/L guar to tap water.

The viscosities of Formulations 1-5 were measured immediately after mixing. To measure the viscosity of the solutions, 12 mL samples were loaded into a rheometer cup in a Bohlin rheometer with a C25 configuration. The rheology tests were performed at a shear rate of 1, 10, and 100 s$^{-1}$ at 22° C., the results of which are shown in FIG. 6.

Figure 6:
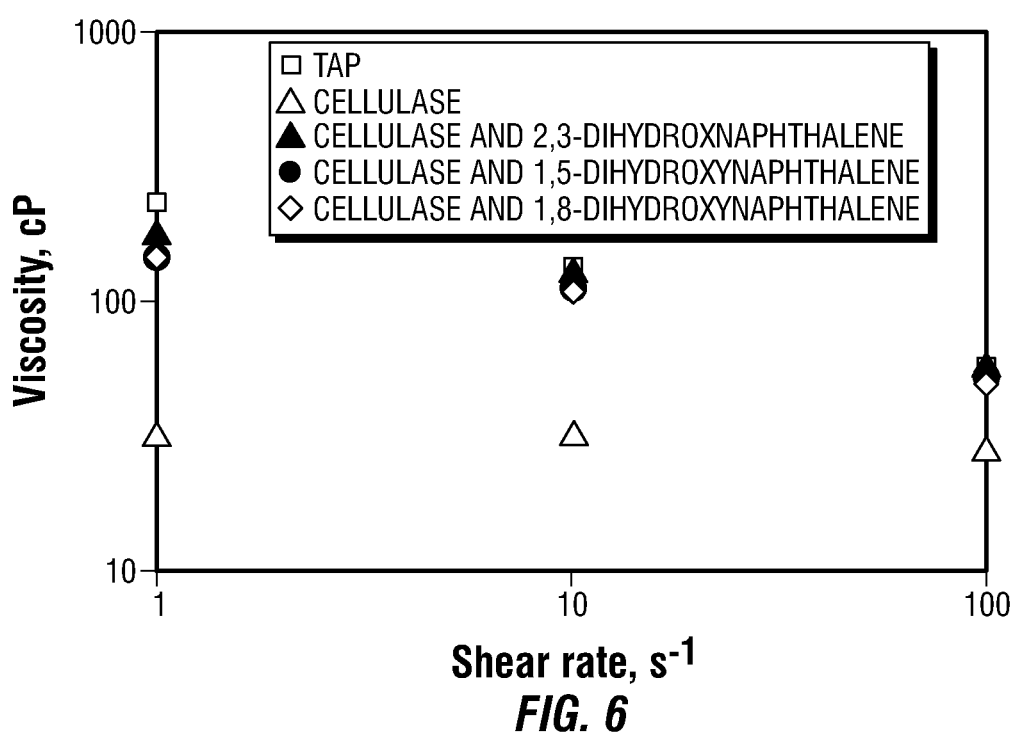
FIG. 6 is a graph illustrating the viscosity increasing effects of 2,3-dihydroxynaphthalene, 1,5-dihydroxynaphthalene, and 1,8-dihydroxynaphthalene at shear rates of 1, 10, and 100 $s^{-1}$.

As shown in FIG. 6, the cellulase in Formulation 2 degraded the guar biopolymer. As a result, Formulation 2 had a lower viscosity compared to that of Formulation 1, which did not contain the cellulase enzymes. When 0.36 g/L of 2,3-dihydroxynaphthalene (Formulation 3), 0.6 g/L of 1,5-dihydroxynaphthalene (Formulation 4), or 0.12 g/L of 1,8-dihydroxynaphthalene (Formulation 5) was added as a deactivator to the fluid with cellulase, the degradation of the biomaterial was impeded. The viscosities of Formulations 3-5 were similar to that of Formulation 1, in which the tap water had a minimal concentration of bacterial and fungal cells.

Example 6

Formulation 1 was prepared by adding 3.6 g/L guar to tap water.

Formulation 2 was prepared by adding 200 ppm cellulase and 3.6 g/L guar to tap water.

Formulation 3 was prepared by adding 200 ppm cellulase, 0.96 g/L of 5-amino-1-naphthol, and 3.6 g/L guar to tap water.

Formulation 4 was prepared by adding 200 ppm cellulase, 0.36 g/L sesamol, and 3.6 g/L guar to tap water.

The viscosities of Formulations 1-4 were measured immediately after mixing. To measure the viscosity of the solutions, 12 mL samples were loaded into a rheometer cup in a Bohlin rheometer with a C25 configuration. The rheology tests were performed at a shear rate of 1, 10, and 100 s$^{-1}$ at 22° C., the results of which are shown in FIG. 7.

Figure 7:
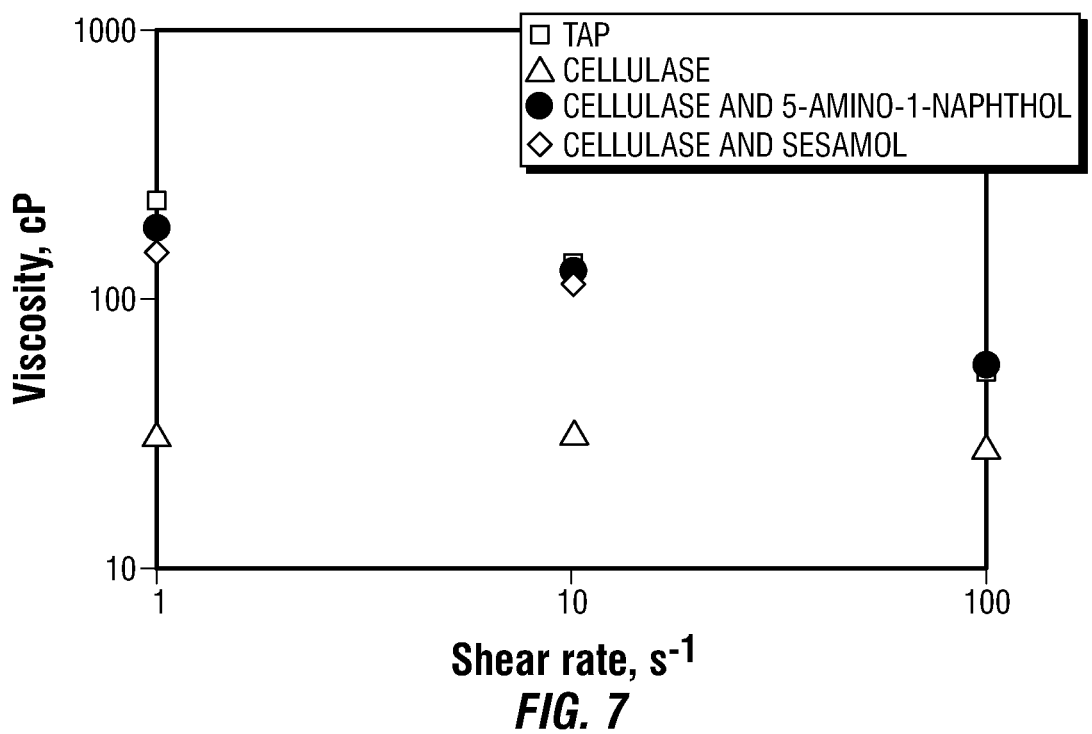
FIG. 7 is a graph illustrating the viscosity increasing effects of 5-amino-1-naphthol and sesamol at shear rates of 1, 10, and 100 $s^{-1}$.

As shown in FIG. 7, the cellulase in Formulation 2 degraded the guar biopolymer. As a result, Formulation 2 had a lower viscosity compared to that of Formulation 1, which did not contain the cellulase enzymes. When 0.96 g/L 5-amino-1-naphthol (Formulation 3) or 0.36 g/L sesamol (Formulation 4) was added as a deactivator to the fluid with cellulase, the degradation of the biomaterial was impeded. The viscosities of Formulations 3 and 4 were similar to that of Formulation 1, in which the tap water had a minimal concentration of bacterial and fungal cells.

Example 7

Formulation 1 was prepared by adding 3.6 g/L guar to tap water.

Formulation 2 was prepared by adding 200 ppm cellulase and 3.6 g/L guar to tap water.

Formulation 3 was prepared by adding 200 ppm cellulase, 0.6 g/L of 1,2,3-trimethoxybenzene, and 3.6 g/L guar to tap water.

Formulation 4 was prepared by adding 200 ppm cellulase, 0.6 g/L 1,3,5-trimethoxybenzene, and 3.6 g/L guar to tap water.

The viscosities of Formulations 1-4 were measured immediately after mixing. To measure the viscosity of the solutions, 12 mL samples were loaded into a rheometer cup in a Bohlin rheometer with a C25 configuration. The rheology tests were performed at a shear rate of 1, 10, and 100 s$^{-1}$ at 22° C., the results of which are shown in FIG. 8.

Figure 8:
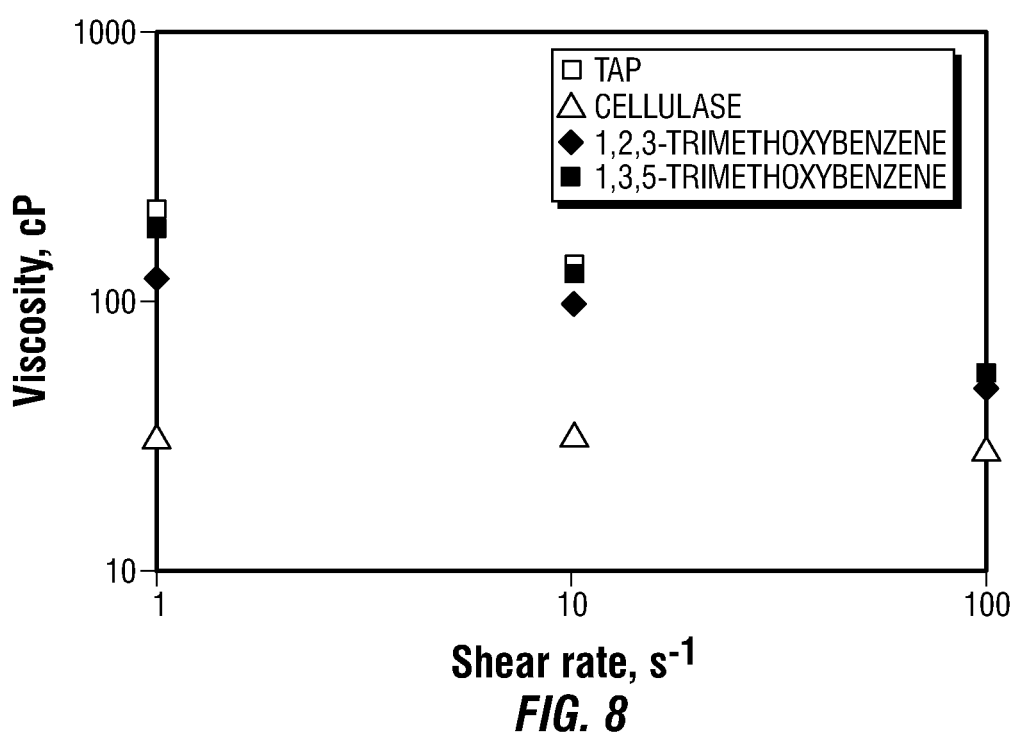
FIG. 8 is a graph illustrating the viscosity increasing effects of 1,2,3-trimethoxybenzene, and 1,3,5-trimethoxybenzene at shear rates of 1, 10, and 100 $s^{-1}$.

As shown in FIG. 8, the cellulase in Formulation 2 degraded the guar biopolymer. As a result, Formulation 2 had a lower viscosity compared to that of Formulation 1, which did not contain the cellulase enzymes. When 0.6 g/L 1,2,3-trimethoxybenzene (Formulation 3) or 0.6 g/L 1,3,5-trimethoxybenzene (Formulation 4) was added as a deactivator to the fluid with cellulase, the degradation of the biomaterial was impeded. The viscosities of Formulations 3 and 4 were similar to that of Formulation 1, in which the tap water had a minimal concentration of bacterial and fungal cells.

Example 8

Formulation 1 was prepared by adding 3.6 g/L xanthan to tap water.

Formulation 2 was prepared by adding 200 ppm cellulase and 3.6 g/L xanthan to tap water.

Formulation 3 was prepared by adding 200 ppm cellulase, 0.6 g/L of 1,5-dihydroxynaphthalene, and 3.6 g/L xanthan to tap water.

The viscosities of Formulations 1-3 were measured immediately after mixing. To measure the viscosity of the solutions, 12 mL samples were loaded into a rheometer cup in a Bohlin rheometer with a C25 configuration. The rheology tests were performed at a shear rate of 1, 10, and 100 s$^{-1}$ at 22° C., the results of which are shown in FIG. 9.

Figure 9:
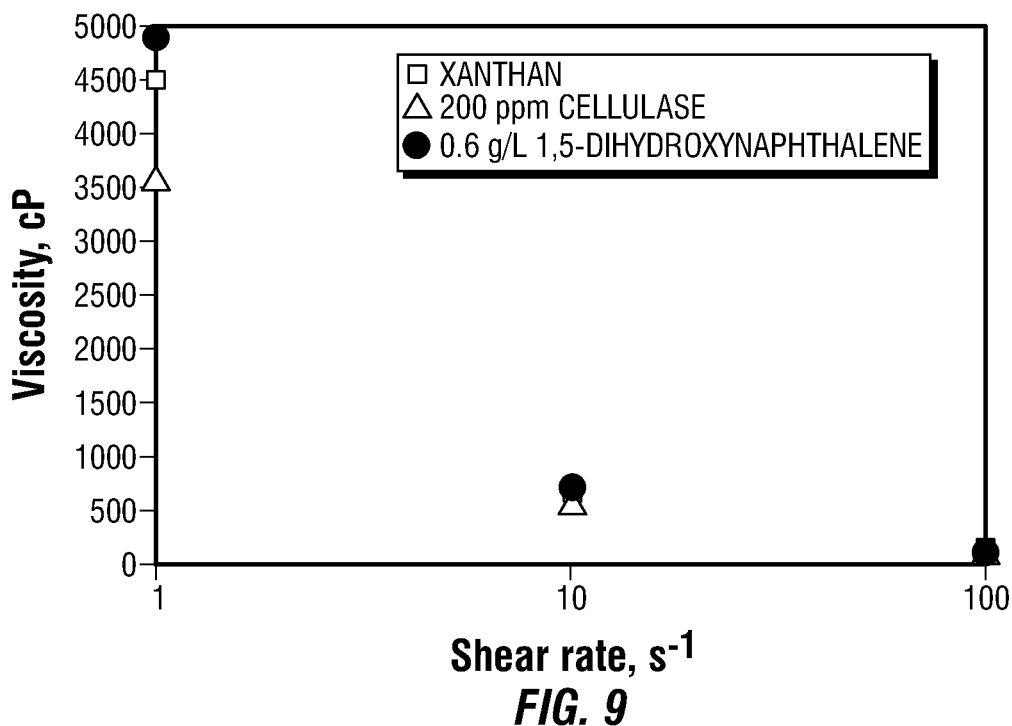
FIG. 9 is a graph illustrating the viscosity increasing effects of 1,5-dihydroxynaphthalene at shear rates of 1, 10, and 100 $s^{-1}$.

As shown in FIG. 9, the cellulase in Formulation 2 degraded the xanthan biopolymer. As a result, Formulation 2 had a lower viscosity compared to that of Formulation 1, which did not contain the cellulase enzymes. When 0.6 g/L of 1,5-dihydroxynaphthalene (Formulation 3) was added as a deactivator to the fluid with cellulase, the degradation of the biomaterial was impeded. The viscosity of Formulation 3 was similar to that of Formulation 1, in which the tap water had a minimal concentration of bacterial and fungal cells.

Example 9

Formulation 1 was prepared by adding 3.6 g/L carboxymethyl cellulose to tap water.

Formulation 2 was prepared by adding 200 ppm cellulase and 3.6 g/L carboxymethyl cellulose to tap water.

Formulation 3 was prepared by adding 200 ppm cellulase, 0.6 g/L of 1,5-dihydroxynaphthalene, and 3.6 g/L carboxymethyl cellulose to tap water.

The viscosities of Formulations 1-3 were measured immediately after mixing. To measure the viscosity of the solutions, 12 mL samples were loaded into a rheometer cup in a Bohlin rheometer with a C25 configuration. The rheology tests were performed at a shear rate of 1, 10, and 100 s$^{-1}$ at 22° C., the results of which are shown in FIG. 10.

Figure 10:
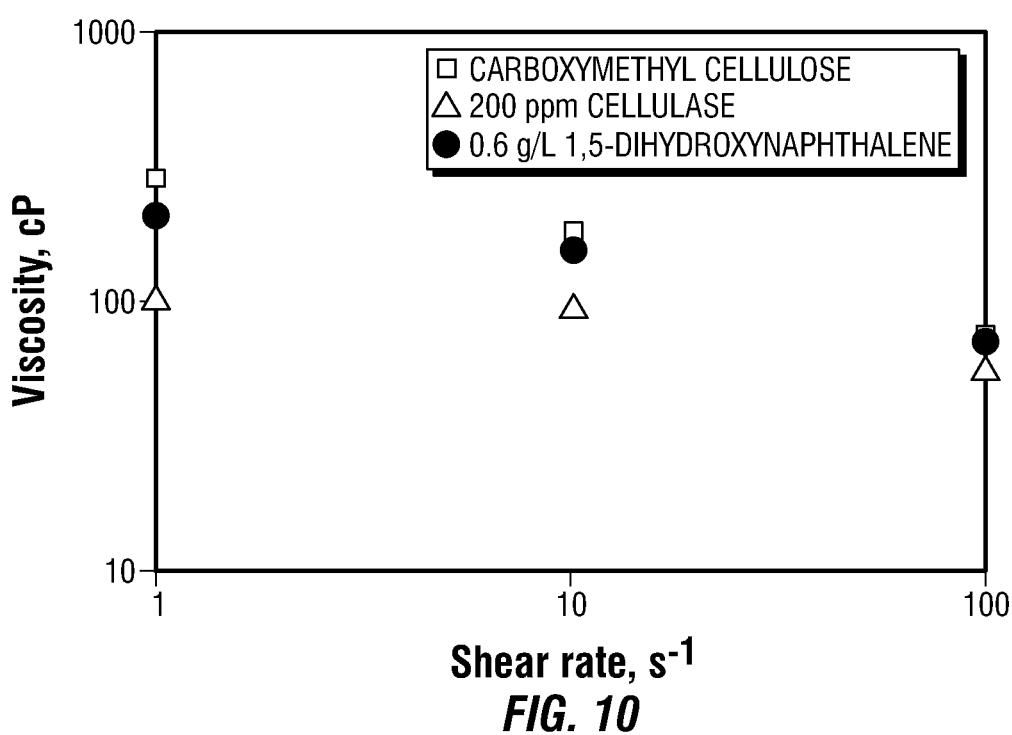
FIG. 10 is a graph illustrating the viscosity increasing effects of 1,5-dihydroxynaphthalene at shear rates of 1, 10, and 100 $s^{-1}$.

As shown in FIG. 10, the cellulase in Formulation 2 degraded the carboxymethyl cellulose biopolymer. As a result, Formulation 2 had a lower viscosity compared to that of Formulation 1, which did not contain the cellulase enzymes. When 0.6 g/L of 1,5-dihydroxynaphthalene (Formulation 3) was added as a deactivator to the fluid with cellulase, the degradation of the biomaterial was impeded. The viscosity of Formulation 3 was similar to that of Formulation 1, in which the tap water had a minimal concentration of bacterial and fungal cells.

Although only a few example embodiments have been described in detail above, those skilled in the art will readily appreciate that many modifications are possible in the example embodiments without materially departing from the method for treating a subterranean formation. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

What is claimed is:

1. A method for treating a subterranean formation, the method comprising:

combining an aqueous fluid, a biomaterial, an enzyme, and a deactivator to form a non-crosslinked treatment fluid; and introducing the non-crosslinked treatment fluid into the subterranean formation; wherein:

the enzyme degrades the biomaterial; and the deactivator is an oxygen-containing arene capable of inhibiting the enzyme from degrading the biomaterial, wherein the deactivator comprises at least one of a naphthol, dimethoxybenzene, trimethoxybenzene, and a structure represented by

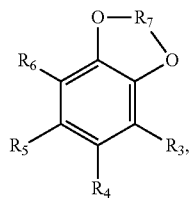

wherein:

R7 represents an alkyl group having about 1 to about 5 atoms optionally including one or more heteroatoms, and R3, R4, R5, and R6 each independently represents a hydrogen atom, a hydroxyl group, an alkyl group, an alkene group, an ester, a carboxylic acid, an alcohol, an aldehyde, a ketone, an aryl, an aryloxy, cycloalkyl, a carbonyl, or an amino group, wherein the non-crosslinked treatment fluid does not crosslink.

2. The method according to claim 1, wherein at least a portion of the enzyme is produced by bacterial and/or fungal cells present in the aqueous fluid.

3. The method according to claim 1, further comprising adjusting a viscosity of the treatment fluid to be a viscosity in a range of from about 10 cP to about 5,000 cP before introducing the treatment fluid into the subterranean formation.

4. The method according to claim 3, wherein adjusting the viscosity of the treatment fluid comprises increasing an amount of the deactivator in the treatment fluid.

5. The method according to claim 4, wherein the amount of the deactivator in the treatment fluid is increased to an amount in a range of from about 0.005 g/L to about 15 g/L.

6. The method according to claim 1, wherein the enzyme is selected from a group consisting of mannanase, glucosidase, cellulase, amylase, hydrolase, and glucanase.

7. The method according to claim 1, wherein the deactivator is selected from a group consisting of dihydroxymethoxybenzene, dihydroxy-dimethoxybenzene, liginsulfonate, 1 amino-2-naphthol, 2-amino-1-naphthol, 3-amino-2-naphthol, 4-amino-1-naphthol, 8-amino-1-naphthol, 5-amino-1-naphthol, 1,2-dimethoxybenzene, 1,3-dimethoxybenzene, 1,2,3-trimethoxybenzene, 1,2,4-trimethoxybenzene, 1,2,5-trimethoxybenzene, 1,2,6-trimethoxybenzene, and 1,3,5-trimethoxybenzene, 1,3-benzodioxole, benzo-1,4,-dioxane, 2,3-dihydro-1,4,-benzodioxin-5-ol, 5-methoxy-1,3-benzodioxole, 5,6-dihydroxy-1,3-benzodioxole, sesamol, 5-methyl-1,3-benzodioxole, sesamin, piperonyl alcohol, piperonal, and 3,4-methylenedioxy aniline, 1,8-dihydroxynaphthalene, 1,5-dihydroxynaphthalene, 2,3-dihydroxynaphthalene, 2,7-dihydroxynaphthalene, 1,7-dihydroxynaphthalene, and 2,6-dihydroxynaphthalene.

8. The method according to claim 1, wherein the biomaterial is selected from a group consisting of guar gum, locust bean gum, tara gum, honey locust gum, tamarind gum, karaya gum, arabic gum, ghatti gum, tragacanth gum, carrageenan, succinoglycan, xanthan, diutan, alginate, hydroxylethyl guar, hydroxypropyl guar, carboxymethylhydroxypropyl guar, carboxymethyl cellulose, carboxyethyl cellulose, carboxymethyl guar, carboxymethylhydroxyethyl cellulose, and combinations thereof.

9. The method according to claim 2, wherein prior to forming the treatment fluid, the method further comprises measuring an amount of the bacterial and/or fungal cells in the aqueous fluid.

10. The method according to claim 9, further comprising:

determining an effective amount of the deactivator for controlling a viscosity of the treatment fluid to be in a range of from about 10 cP to about 5,000 cP based on the measurement of the amount of bacterial and/or fungal cells present in the aqueous fluid; and combining the effective amount of the deactivator with the aqueous fluid, the biomaterial, and the enzyme.

11. The method according to claim 1, wherein the treatment fluid further comprises proppant particles.

12. A method for treating a subterranean formation, the method comprising:

preparing a non-crosslinked treatment fluid comprising an aqueous fluid, a biomaterial, and a deactivator;

controlling degradation of the biomaterial by adding an effective amount of the deactivator to the aqueous fluid prior to the preparation of the treatment fluid; and introducing the non-crosslinked treatment fluid into the subterranean formation;

wherein:

the aqueous fluid comprises bacterial and/or fungal cells that produce an enzyme that degrades the biomaterial;

the deactivator is an oxygen-containing arene capable of inhibiting the enzyme from degrading the biomaterial, the deactivator comprising at least one of a naphthol, dimethoxybenzene, trimethoxybenzene, and a structure represented by

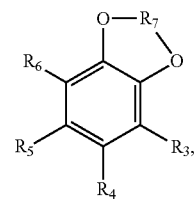

where:

R7 represents an alkyl group having about 1 to about 5 atoms optionally including one or more heteroatoms; and R3, R4, R5, and R6 each independently represents a hydrogen atom, a hydroxyl group, an alkyl group, an alkene group, an ester, a carboxylic acid, an alcohol, an aldehyde, a ketone, an aryl, an aryloxy, cycloalkyl, a carbonyl, or an amino group, wherein the non-crosslinked treatment fluid does not crosslink.

13. The method according to claim 12, wherein a viscosity of the treatment fluid is in a range of from about 10 cP to about 5,000 cP before introducing the treatment fluid into the subterranean formation.

14. The method according to claim 12, wherein the enzyme is selected from a group consisting of mannanase, glucosidase, cellulase, amylase, hydrolase, and glucanase.

15. The method according to claim 12, wherein the effective amount of the deactivator is an amount in a range of from about 0.005 g/L to about 15 g/L.

16. The method according to claim 12, wherein the deactivator is selected from a group consisting of dihydroxy-methoxybenzene, dihydroxy-dimethoxybenzene, liginsulfonate, 1 amino-2-naphthol, 2-amino-1-naphthol, 3-amino-2-nahthol, 4-amino-1-naphthol, 8-amino-1-naphthol, 5-amino-1-naphthol, 1,2-dimethoxybenzene, 1,3-dimethoxybenzene, 1,2,3-trimethoxybenzene, 1,2,4-trimethoxybenzene, 1,2,5-trimethoxybenzene, 1,2,6-trimethoxybenzene, and 1,3,5-trimethoxybenzene, 1,3-benzodioxole, benzo-1,4,-dioxane, 2,3-dihydro-1,4,-benzodioxin-5-ol, 5-methoxy-1,3-benzodioxole, 5,6-dihydroxy-1,3-benzodioxole, sesamol, 5-methyl-1,3-benzodioxole, sesamin, piperonyl alcohol, piperonal, and 3,4-methylenedioxy aniline, 1,8-dihydroxynaphthalene, 1,5-dihydroxynaphthalene, 2,3-dihydroxynaphthalene, 2,7-dihydroxynaphthalene, 1,7-dihydroxynaphthalene, and 2,6-dihydroxynaphthalene.

17. The method according to claim 12, wherein the biomaterial is selected from a group consisting of guar gum, locust bean gum, tara gum, honey locust gum, tamarind gum, karaya gum, arabic gum, ghatti gum, tragacanth gum, carrageenan, succinoglycan, xanthan, diutan, alginate, hydroxylethyl guar, hydroxypropyl guar, carboxymethylhydroxypropyl guar, carboxymethyl cellulose, carboxyethyl cellulose, carboxymethyl guar, carboxymethylhydroxyethyl cellulose, and combinations thereof.

* * * * *